Oct. 29, 1968  R. A. McCLINTOCK ET AL  3,407,767
STABILIZED FLOATING APPARATUS
Filed Sept. 22, 1966  3 Sheets-Sheet 1

United States Patent Office 3,407,767
Patented Oct. 29, 1968

3,407,767
STABILIZED FLOATING APPARATUS
Ross A. McClintock, Huntington Harbour, and Gunnar B. Bergman, Pasadena, Calif., assignors to Pike Corporation of America, Los Angeles, Calif., a corporation of California
Filed Sept. 22, 1966, Ser. No. 581,289
11 Claims. (Cl. 114—.5)

ABSTRACT OF THE DISCLOSURE

A floating structure stabilized against rolling movements induced by wave action comprising a stabilizing body coupled to a vessel or other buoyant body, the stabilizing body being positioned a substantial distance beneath the vessel below the severe wave and surface action of the water. The stabilizing body is freely movable in the vertical direction and is adapted to resist movement in a direction transverse to the vertical direction. The stabilizing bodies in two of the preferred embodiments of the invention are an open ended cylinder and parallel baffle plates. The stabilizing body is coupled to the hull of a vessel by buoyancy forces and is selectively separable from the hull of the vessel by balasting the coupling means and thereby lowering it in the water.

---

This invention relates to the stabilization of floating vessels and structures. Exploration and exploitation of oil and other mineral resources on and below the ocean floor depend upon the stability of floating vessels and structures under a variety of wave and tide conditions to conduct operations. Other operations at sea require a stable platform or a platform of predictable or controllable movement characteristics.

Although not limited thereto the present invention is particularly applicable to offshore drilling operations for oil and will accordingly be described in connection with such operations. It will be seen, however, that the present invention is also applicable to the stabilization of other floating structures including, such as, floating observation platforms, dry docks, temporary loading platforms and buoys.

In the present state of the art, drilling beneath a body of water is accomplished from floating vessels, semi-submersible platforms and fixed platforms. Fixed platforms are supported from the ocean floor by legs which position the drilling platform above the wave action of the water surface. Such platforms are, of course, severely limited by the depth of water in which they can be utilized. Semi-submersibles and drilling vessels are capable of working in waters of any depth. Semi-submersibles as is well known rely upon buoyancy chambers positioned beneath the wave action to support the drilling platform above the wave action. Such semi-submersibles are of many designs, are extremely expensive and are subject to rough weather problems, tidal actions and other force factors because they are substantially fixed in location when set up for operation.

Drilling vessels in which the drilling operation is carried on from a floating vessel are well known and are shown, for example, in U.S. Patent No. 3,177,954. These vessels offer many advantages over semi-submersibles, one advantage being that of mobility, since they can move to and from any location quickly. Additionally, the cost of such vessels, while presently considerably less than semi-submersible platforms can be further reduced if width can be reduced while maintaining or increasing stability. A primary disadvantage of such drilling vessels is the relative in stability of the deck of the vessel, which deck having the drilling derrick and equipment positioned thereon constitutes the drilling platform. That is, since the drilling vessel is freely floating, it is subject to wave action. This is true even though the vessel is firmly anchored in position, since anchor cables must necessarily include catenaries sufficient to allow wave action on the vessel including, heave, pitch, sway, and roll. When the roll or pitch of the vessel becomes excessive drilling operations become difficult. The adverse effects of roll of the vessel are magnified at the crown block of the drilling derrick. Drilling equipment, pipe string, or other drilling tools in the derrick will swing in response to vessel roll, and since such equipment is exceedingly heavy, property damage and personal danger can result.

As employed in this specification roll refers to rotational movement about the longitudinal axis of the buoyant body (i.e., vessel); pitch refers to the rotational movement about the transverse axis at the buoyant body; sway refers to horizontal movement of the buoyant body; and heave refers to vertical movement of the buoyant body.

On floating vessels the optimum roll may vary dependent upon the use of the floating structure. That is, the definition of optimum rolling conditions depends upon the characteristics of the structure and the operation to be achieved therefrom. For many operations conducted from a floating structure, such as visual tracking platforms, radar platforms, missile tracking stations and the like, no rolling motion would be desirable. In certain subsea operations such as drilling operations stresses in drill string and riser pipe can be minimized if the ship leans slightly into the wave or has a negative roll factor as discussed more fully hereinafter.

A still different definition of optimum roll for a vessel or structure is obtained if the working conditions of the crew in handling objects are to be optimized. Under such a criterion it is desirable that at all times the resultant forces of gravity and inertial forces acting upon crew members and objects they are handling are perpendicular to the deck upon which they are working.

In accordance with the present invention such optimization can be achieved for specific purposes as described more fully hereinafter. In connection with the application of the present invention to floating drilling vessels, vertical movement or heave of the ship in response to wave or tidal action, causes little or no difficulty since drilling apparatus is constructed to accommodate the vertical movement of the ship. Also pitch in response to wave action is normally tolerable. Additionally, since most vessels have a beam that is small compared to frequently occurring wave lengths, the rolling motion of the ship combined with the sway is the movement of most concern.

One method of controlling such rolling motion of these ocean going drilling vessels is to rigidly attach to the hull of the vessel a mass trap, such as, an open ended cylinder which depends from the vessel into the sea to a predetermined depth. This mass trap has high inertia and opposes and tends to minimize rolling motion of the vessel. However, since the mass trap is permanently attached to the hull of the vessel it increases the draft of the vessel drastically and the vessel is, therefore, able to sail only in deeper waters. Additionally, the present invention provides a stabilization structure which can be retained at the well site when the operational vessel is caused to be removed temporarily or the structure can become a permanent or semi-permanent installation by anchoring in location so that vessels can return periodically for servicing or additional work on the well after the initial drilling or other operations have been completed.

It is a primary object of the present invention to provide means for stabilizing a floating structure to reduce to predetermined limits the amount by which the decks or normally horizontal components of the structure are inclined from the horizontal plane in response to wave action.

It is another object of the present invention to provide apparatus and means in combination with a floating structure to minimize the pitch and roll of such a structure in response to wave action.

Another object of the present invention is to provide apparatus in combination with a floating vessel which allows the vessel to sway and heave in response to wave action but controls the roll of the vessel to predetermined tolerable limits.

Yet another object of the present invention is to provide apparatus that is selectively attachable to or removable from the hull of the floating vessel and which allows the vessel to sway and heave in response to wave action but controls the roll of the vessel to predetermined tolerable limits.

Still another object of the present invention is to provide apparatus which can be moved from one location to a different location, and which can be selectively attached to the hull of the floating vessel and thereby minimizes the pitch and roll of such a vessel in response to the wave action.

Another object of the present invention is to increase the stability of a floating structure or vessel which serves as a platform from which undersea operations are performed.

The present invention comprises in general terms, a buoyant body and a stabilizing body coupled to and positioned a substantial distance beneath the buoyant body below the severe wave and surface action of the water. The stabilizing body being so constructed and arranged as to be freely moveable in a direction parallel to a line affixing the stabilizing body to the buoyant body and to resist movement transverse to that direction. A coupling means connects the stabilizing body to the buoyant body such that the coupling means transmits a force moment to the buoyant body. The coupling means is selectively separable from the buoyant body.

The novel features which are believed to be characteristic of the invention both as to its organization and method of operation together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

In the drawings:

FIGURE 8 is a wave and vessel position diagram illustrating the operation of the present invention;

The present invention relates to a passive means for stabilization of a buoyant body, including a means for coupling a stabilizing body to a buoyant body such that the stabilizing body can easily be uncoupled from the buoyant body. The roll stabilization of buoyant bodies has been a problem for which many solutions have been proposed. Such stabilizers are of the active or passive type. Among the passive type are bilge keels and resonant water tank systems which are advantageous for some uses but are not sufficiently effective for stabilization of the types of structures described herein, especially in a confused sea. Other types of passive stabilizers include mass traps which are rigidly attached to the hull of a vessel and which depend from it to a predetermined depth beneath the surface. These, however, are only efficient when placed on large vessels which will not be required to go into relatively shallow water and which will not be required to go from location to location. The active systems require shipboard power for their operation, and to be effective become very expensive and complex. Active stabilizers are primarily used on moving vessels such as, passenger ships. The device of the present invention is of the passive type and is adapted to be coupled or uncoupled to vessels at new locations in either deep or shallow waters.

Figures 1, 2, 3, 4, 5, 6:
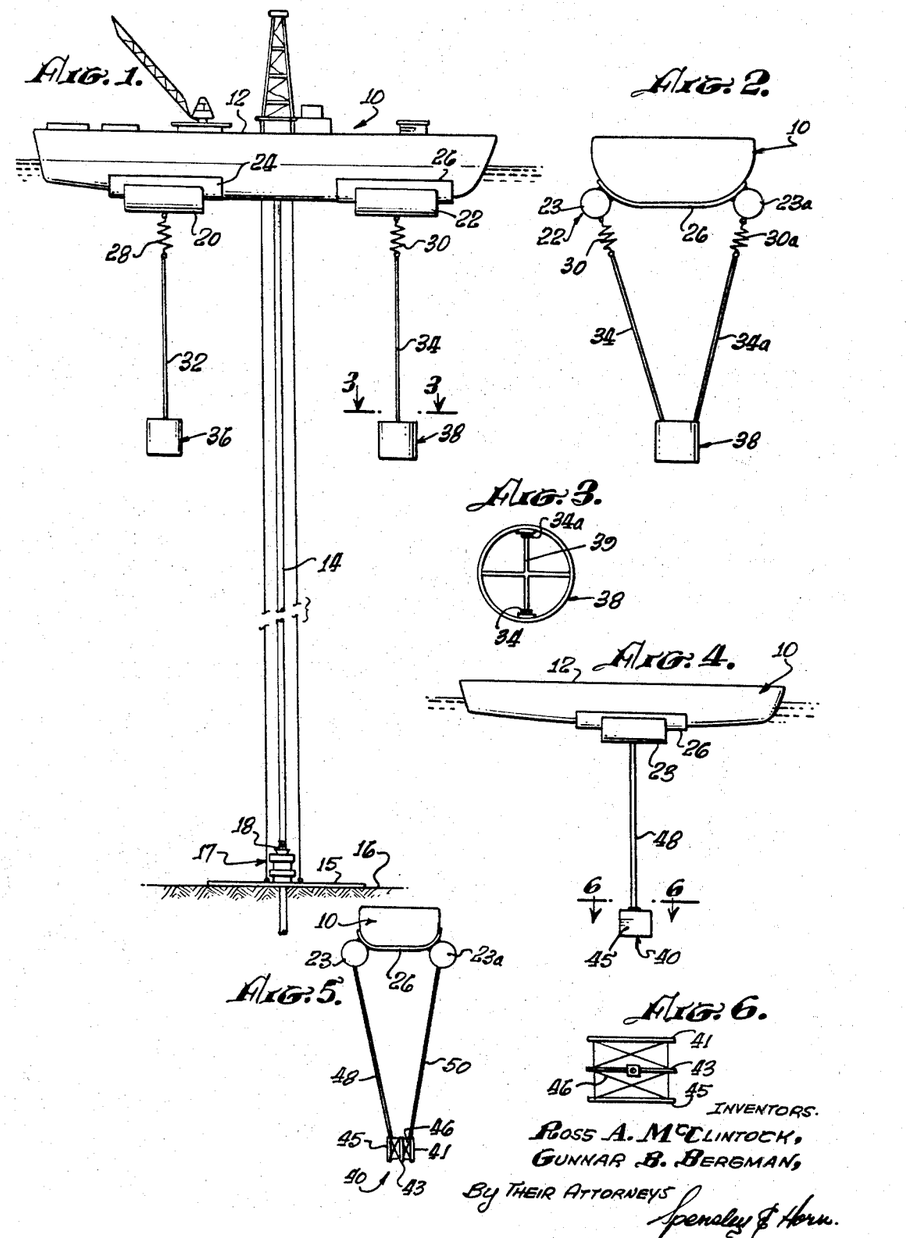
FIGURE 1 is a view in elevation of an illustrative embodiment of the present invention.
FIGURE 2 is a simplified right end view of the embodiment shown in FIGURE 1.
FIGURE 3 is a plan view taken along line 3—3 of FIGURE 1.
FIGURE 4 is a view in elevation of an alternative embodiment of the present invention.
FIGURE 5 is a simplified right end view of the embodiment shown in FIGURE 4.
FIGURE 6 is a plan view taken along line 6—6 of FIGURE 4.

Referring now to FIGURES 1, 2 and 3, there is shown schematically a buoyant body such as a vessel including apparatus of the present invention. The vessel designated 10 is shown as a typical offshore drilling vessel having a center well through which drilling operations are conducted with a drilling derrick mounted thereabove. Drilling operations are carried out in a well known manner from the operating deck 12, and in the figure the drilling vessel is shown with a riser pipe 14 connected from the vessel to the ocean floor. The method and apparatus for drilling from the vessel are well known to the art, and form no part of the present invention. It should be noted, however, that such apparatus typically includes a base plate 15 anchored to the ocean floor 16 with matching leads 17 for connecting and disconnecting the riser pipe to the wellhead. The riser pipe sometimes termed conductor tube is provided with a deflection joint 18 and slip joint (not shown) to allow horizontal and vertical movement respectively of the vessel relative to the wellhead or base plate. Mud circulation means, cooling means, packer means, blowout preventers, and vessel anchoring means of the well-known type may also be provided.

In accordance with the present invention, suspended beneath the vessel are forward and aft stabilizing bodies 36 and 38, each of which is mounted to the hull of the vessel by coupling means 20 and 22 as described more fully hereinafter. The stabilizing bodies and coupling means are substantially identical in construction (although perhaps not dimensionally). For this reason only stabilizing body 38 and coupling means 22 will be described in detail.

In the embodiment shown the stabilizing bodies comprise an open ended cylinder (FIGURE 3). The open ended cylindrical body is vertically orientated and symmetrical with respect to a plane passing through the longitudinal axis of the vessel perpendicular to the deck. The cylinder is elongated and is affixed to coupling means 22 by means of cables 34 and 34a. To function most effectively the stabilizing body 38 should be located at a depth equal to or exceeding one sixth of the wave length of the ocean waves under consideration. Typically, the depth at which the stabilizing body 38 is located in connection with an offshore drilling barge is 50 to 200 feet.

In the illustrative embodiment as shown in FIGURES 1, 2 and 3, the height and diameter of the stabilizing body when in the form of a cylinder provides a substantial area in the vertical plane. The thickness of such a cylinder wall is such that little or no substantial area is presented in the horizontal plane, as shown in FIGURE 3. From the foregoing it can be seen that the volume within the cylinder is freely accessible to and filled with water to define a captive mass in the horizontal direction transverse to the centerline of the ship as discussed more fully hereinafter. There is, in addition, the effective mass of the surrounding water adding up to a considerable total inertial mass. The cylinder is thus freely movable in the vertical direction while being substantially immovable in the horizontal direction.

In the presently preferred embodiment of the invention the underwater stabilizing body 38 is affixed to the coupling means 22 by means having a predetermined degree of elastic compliance. In the embodiment of FIGURES 1, 2 and 3 the stabilizing body must be of sufficient weight to maintain the cables in tension at all times. As compared to the embodiment utilizing rigid struts, as shown in FIGURES 4, 5 and 6, the embodiment having cables with means for providing elastic restoring force provides control of the stabilizing force and provides greater efficiency in maintaining the deck level without overcorrection to cause the vessel to lean into the wave. Specifically the cables 34 and 34a extend from the stabilizing body 38 and are attached to the underside of floatation bodies 23 and 23a. Elastic means such as springs 30 are utilized at the ends of the cables 34 and 34a to couple the cables to the floatation bodies. Such spring means can be attached in any convenient manner between the cables and the floatation bodies. The spring means may form an integral part of the cables by appropriate connection thereto. This arrangement allows a predetermined elastic restoring force to be incorporated into the cables and allows the length of the cables to vary within prescribed limits for the purposes described hereinafter. It is possible to use other means for applying an elastic restoring force such as, for example, spring loaded winches positioned on the floatation bodies or cables which have inherent spring force. All of these means are considered broadly to be within the term spring means.

The cables 34 and 34a are affixed to the cylinder in any suitable structural manner as, for example, by welding to the cylinder wall or at opposite points of the transverse diameter thereof or by forming a spider 39 in the interior of the cylinder and affixing a cable to the cylinder wall proximate the opposite ends of one of the spider members 39 as shown in FIGURE 2. At their upper ends cables 34 and 34a are attached to the undersides of floatation members 23 and 23a by any conventional means such as, for example, by welding.

In the presently preferred embodiment of the invention two coupling means are employed in a predetermined longitudinally spaced relationship at the forward and aft end of the hull of the vessel to transmit a force moment from cylindrical bodies 36 and 38 to the hull of the vessel 10. As stated above the two coupling means employed are identical and only one will therefore be described herein. The coupling means 22 comprises hollow floatation bodies 23 and 23a and a cradle 26 which bridges the floatation bodies and which is attached thereto. The floatation bodies 23 and 23a are hollow cylindrical bodies which were adapted to receive and to discharge ballast which is most generally water. Means, not shown, such as suitable pumps and valves are provided for filling and discharging ballast from the floatation bodies. The cradle 26 is an arcuate structure of sufficient rigidity and strength to apply a lifting force to the hull of the vessel. The cradle can be a framework of steel beams contoured to fit transverse to the longitudinal axis beneath the hull of the floating vessel. Thus when floatation bodies 23 and 23a are emptied of ballast their buoyancy causes them to rise in the water and to force the cradle against the bottom of the hull of the vessel, thereby raising the hull higher in the water. The pressure exerted by the floatation bodies 23 and 23a forcing cradle 26 against the bottom of hull 10, effectively couples stabilizing body 38 to the hull. When the coupling means is in position against the hull, the stabilizing body imparts a force moment about the longitudinal centerline or roll axis of the ship as a roll stabilizing force. When it is desired to move the vessel from its present location to a new location, ballast is pumped into floatation bodies 23 and 23a. This causes them to lose their buoyancy and to sink lower into the water, thus removing cradle 26 from the hull of the vessel. The ship is then free to move away. When it is desired to move the vessel from its present location to a new location, ballast is pumped into floatation bodies 23 and 23a. This causes them to lose their buoyancy and to sink lower into the water, thus removing cradle 26 from the hull of the vessel. The ship is then free to move away. When it is desired to couple a stabilizing body to a vessel, ballast is pumped into floatation bodies 23 and 23a, until cradle 26 is sufficiently below the surface of the water to allow a vessel to be maneuvered immediately above them. Ballast is then discharged from the floatation bodies which regain their buoyancy and which force cradle 26 against the hull of the vessel with sufficient pressure to couple stabilizing body 38 to the hull.

As discussed hereinbefore, among the six different ways in which a vessel responds to wave action i.e., heaving, surging, swaying, pitching, yawing and rolling, rolling is the most objectionable movement particularly with respect to vessels which are performing subsea drilling and similar operations. Various of the motions which are intrinsic to buoyant platforms are impractical to eliminate. Particularly, heaving and swaying are inherent in any buoyant floating structure since the structure, such as a vessel is strongly coupled to the surrounding water surface for these modes of response.

In analyzing the rolling motion of a vessel the roll factor R can be defined as the ratio of maximum roll angle to maximum wave slope which the vessel is in steady state motion in a small amplitude wave traveling in a direction perpendicular to the longitudinal axis of the vessel. To account for the fact that the rolling motion of the vessel, or other platform is not necessarily in phase with the wave motion, a phase angle X is introduced. The vessel's roll characteristics are thus given by the two quantities R and X both of which are functions of the wave period. Optimum roll characteristics, as discussed hereinbefore, are dependent upon the structure being stabilized and the type of operations being carried out thereon.

The action characteristics of a buoyant stucture including a vessel without sabilization are such that a given buoyant structure has a characteristic roll resonance which is related to the metacentric height and the effective moment of inertia about the longitudinal axis. The period of resonance may be in the range of 5–10 seconds. When the ship is in the wave of a period much longer than the resonance period, R is close to unity and X is close to zero. The decks are in other words at all times very nearly parallel to the tangent plane to the wave at the location of the ship. But as the wave period becomes shorter (shorter than the resonance period) R gradually decreases and sooner or later becomes less than unity. Then, however, X approaches 180° which means that the vessel leans into the wave. It may be concluded that, in general, the natural response of the vessel is never close to optimal under any of the roll criteria hereinbefore discussed.

As discussed hereinbefore the cylindrical stabilizing bodies 36 and 38 in the embodiment of FIGURES 1, 2, and 3 are each affixed to coupling means 20 and 22 which in turn are longitudinally spaced on the hull. Each cylindrical mass trap is open-ended and is vertically orientated and symmetrical with respect to the center line of the vessel. The cylinder is at a predetermined depth below the severe wave and surface water effects and is so orientated that its axis lies vertically in the vertical plane of the centerline of the hull. In the embodiment shown wherein two such underwater bodies are used for illustration they would also preferably by symmetrically oriented with respect to the length as well as the beam of the vessel. In a typical embodiment wherein a drilling vessel of 10,000 tons is employed, a cylinder 25 feet in diameter, 25 feet in height and affixed at a depth 200 feet below the waterline would typically be utilized. When such a cylinder is suspended beneath the vessel it can be seen that it will offer little or no resistance to vertical movement. (The weight of the cylinder itself is treated as being negligible.) However, since it is open-ended and surrounded with water it contains within its walls a cylindrical volume of water 25 feet in diameter. The weight of such a mass of water, assuming the weight of the cylinder to be relatively negligible would be about 350 tons. If a force is exerted horizontally on the cylinder this mass is effectively trapped and the force required to accelerate it horizontally would be a function of the mass of the captive water plus the effective mass of the surrounding water. There is in addition, some drag force due to the horizontal projection of the cylinder alone. Since the mass of water is entrapped during any horizontal movement the resistance of the cylinder to horizontal forces is due primarily to its inertial mass and drag forces can be neglected.

Referring now to FIGURES 4, 5 and 6 there is shown an alternative embodiment of the present invention. In this alternative embodiment the stabilizing body 40 comprises two or more spaced parallel plates 41 and 45 which are generally square or somewhat rectangular in configuration. The plates 41 and 45 extend parallel to the longitudinal centerline of the ship. Suitable structural members 46 which may include an intermediate plate 43 interconnect the plates 41 and 45 to impart structural rigidity to those plates. The stabilizing body 40 is connected to the underside of floatation bodies 23 and 23a by suitable rigid structural members such as, for example, steel I-beams 48 and 50. The stabilizing body depends vertically from the floatation bodies to which it is attached. The coupling means in this embodiment comprise floatation bodies 23 and 23a and a cradle 26 which is connected to the floatation body by suitable structural means such as welding. In operation the coupling means can be raised or lowered by receiving or discharging ballast into the floatation bodies as has been hereinbefore discussed. The steel beams 48 and 50 are affixed to the floatation bodies 23 and 23a in such manner as to transmit a moment arm to the vessel about the longitudinal centerline of the vessel.

The parallel plates of stabilizing bodies 40 and 42 entrap therebetween the volume of water which forms an inertial mass to be moved if the plates are moved in the horizontal plane transverse to the centerline of the ship as discussed hereinbefore. The stabilizing body 40 by having inertial mass transverse to the longitudinal centerline of the vessel is intended to stabilize the vessel only with respect to the roll component of any wave or surface action exerted upon the vessel. It should be noted that in most circumstances where drilling vessels are operating, a current in one direction will be present and relatively constant. By allowing free movement of water through the stabilizing body 40 in both the vertical and longitudinal direction the current forces exerted upon the stabilizing bodies are minimized by proper orientation of the vessel. If the stabilizing body is moved vertically or longitudinally there is substantially no resistance to movements of the current and no force is transmitted to the vessel from the stabilizing bodies. In the embodiment of the present invention as shown in FIGURES 4, 5 and 6 one stabilizing body is shown although an arrangement of two longitudinally spaced bodies is the more practical one for use with drilling or other operational vessels.

In the operation of the preferred embodiment of the present invention as illustrated in FIGURES 1, 2 and 3 stabilizing bodies 36 and 38 are connected to coupling means 20 and 22. The coupling means comprise floatation bodies 23 and 23a to which are connected cradles 24 and 26. When it is desired to affix the stabilizing bodies to the hull of a vessel, ballast such as water is pumped into the floatation bodies. These then become less buoyant and sink lower into the water until the cradles are submerged. A vessel can then be placed in position directly above the cradles. The cradles are so aligned that when ballast is discharged from the floatation bodies the increased buoyancy causes the floatation bodies to rise and to force the cradles against the hull with sufficient pressure to slightly raise the vessel in the water. The pressure exerted against the hull by the buoyant floatation bodies and cradles is sufficient to effectively couple the stabilizing bodies to the hull. Thus, the cylindrical stabilizing bodies allow water to pass through unimpeded in the vertical direction but trap water in the horizontal plane; this makes the cylindrical bodies substantially immovable in the horizontal direction. A discussion of wave motion and induced roll is applicable to the motion and forces occurring about the longitudinal axis of the vessel of FIGURES 1, 2 and 3 and is applicable to both the preferred and alternative embodiment of the present invention.

Figures 7, 8A, 8B, 8C, 8D:
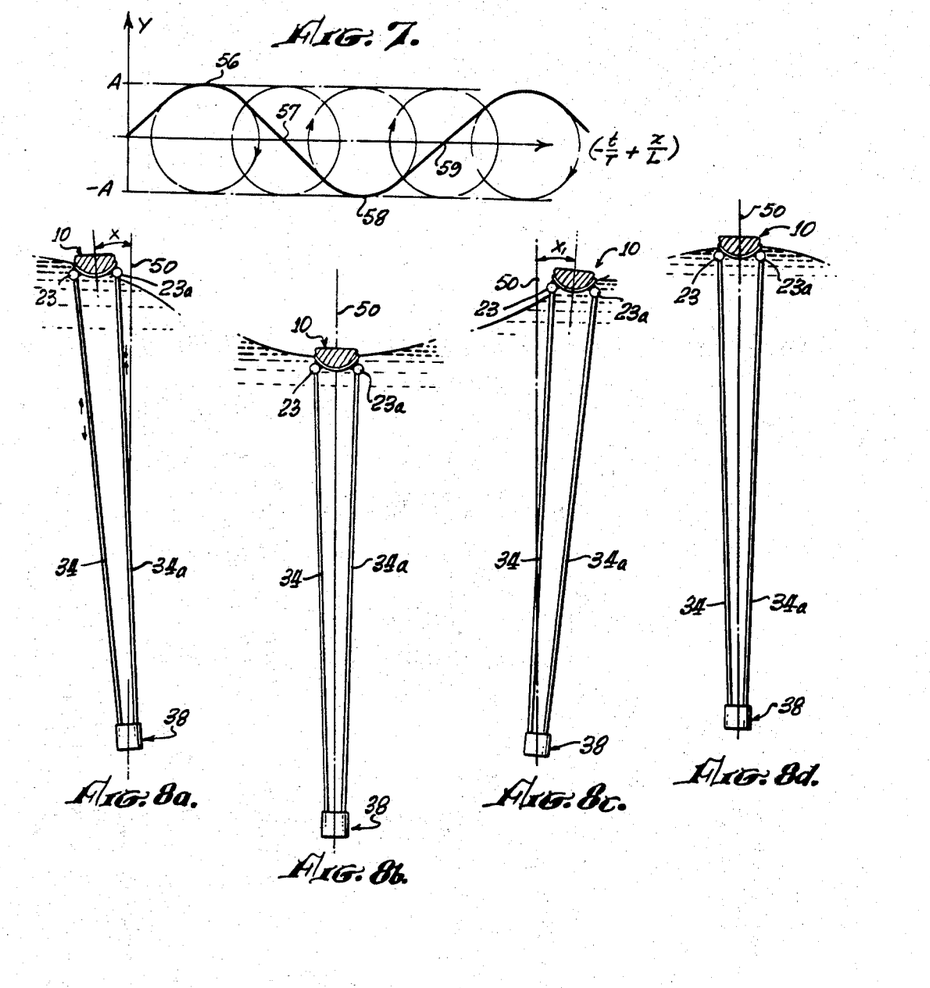
FIGURE 7 is a schematic wave amplitude diagram.

As is well known, the vessel is caused to heave and sway by wave action due to its coupling to the water surface. That is, the vertical position of the vessel is caused to change by the wave action as the water surface rises and falls relative to a position fixed with respect to the floor beneath the water. The fixed position reference line is hereinafter referred to as a line extending vertically upward from a fixed point on the floor of the body of water to the surface of the body of water. Accordingly, in addition to heave (vertical motion) the vessel is caused to move horizontally (i.e., sway) with respect to the fixed position reference line by wave action. The swaying movement, as is well known, is caused by the movement of water particles in a wave. Thus, referring to FIGURES 7 and 8 the fixed position reference line is indicated by the vertical line 50 and is understood to be fixed with respect to the floor beneath the water. In FIGURE 8 the line 50 is transposed to indicate different positions relative to the wave, it being understood, however, that the line 50 is constant in position and it is the wave that is moving. The method of showing wave movement is well known and is employed here for ease of illustration as moving from left to right. In a wave moving from left to right the movement of water particles in the wave is clockwise and is shown in FIGURE 7 at the crest and trough of the wave as well as at the midpoint on the descending and ascending waves. The water movement is illustrated at the crest 56, at the midpoint of the descending wave 57, at the trough 58 and at the midpoint of the ascending wave 59. At the crest and trough of the wave 56 and 58 the buoyant body will be at the upper and lower limits of vertical movement (heave) but there will be no movement from the horizontal position (sway). At point 57, i.e., the midpoint of the wave of descending slope, the buoyant body will be at the midpoint of its vertical excursion but will be forced to the left of line 50 by the sway $x$ in the FIGURE 8a by the clockwise direction of water movement. Similarly, at the midpoint 59 of the ascending wave, the buoyant body is to the right of line 50 by the sway $x_1$ (FIGURE 8c). As discussed above, the underwater stabilizing body 38 strongly resists motion in the transverse direction due to its effective horizontal mass but offers practically no resistance in the vertical direction. The roll factor R can be computed as follows for an embodiment having rigid connections between the stabilizing body and floatation bodies, i.e., no spring means. The wave form is of the following mathematical form as shown in FIGURE 7:

$$Y = A \sin 2\pi\left(\frac{x}{L} - \frac{t}{T}\right) \quad (1)$$

where T is the period of the wave, L is the wave length, and A is the wave amplitude.
The slope is:

$$\frac{dY}{dx} = \frac{2\pi}{L} A \cos 2\pi\left(\frac{x}{L} - \frac{t}{T}\right) \quad (2)$$

The sway X is given by a good approximation as:

$$X = A \cos 2\pi\left(\frac{x}{L} - \frac{t}{T}\right) \quad (3)$$

The slope of the deck is then:

$$\frac{X}{D} = \frac{A}{D} \cos 2\pi\left(\frac{x}{L} - \frac{t}{T}\right) \quad (4)$$

If it is assumed that D (the depth of the stabilizing body) is large enough for vessel 10 to be considered in essentially motionless water, the roll factor R is then the negative of the ratio of these slopes of $$R = -\frac{L}{2\pi D} \quad (5)$$

The negative sign must be used as the buoyant body leans into the wave. It is therefore clear that R can be made as close to zero as is desired simply by making D large enough. The phase angle α is, of course, zero. The negative R means, however, that the ship leans into the wave although with an arbitrarily small angle.

The action of the stabilizing body in stabilizing the vessel can be further seen by reference to FIGURES 8a, 8b, 8c and 8d wherein the vessel is shown at four different wave positions. In FIGURE 8a the vessel is in the descending slope of the wave. The rolling force upon the vessel is in the clockwise direction about the center of gravity of the vessel. The normal position of the vessel without stabilization would be with the deck 12 sloping downward and to the right in FIGURE 8a (i.e., in the direction of slope of the wave). The location of the stabilizing body 38 is horizontally fixed but vertically movable. The height of the stabilizing body is therefore approximately at its mean depth. It can be seen that if the stabilizing body 38 was freely movable both horizontally and vertically it would be swung to the left in the FIGURE 8a by the rolling forces or force moment upon the vessel. Since the stabilizing body 38 is horizontally immovable it creates a force moment through the connecting members 34 and 34a, floatation bodies 23 and 23a, and cradle 26 of FIGURE 1 or the struts 48 and 50, floatation bodies 23 and 23a and cradle 22 of FIGURE 5 in an opposite direction to the rolling moment applied by the wave action to the vessel. Thus, the cable to the left in FIGURE 8a termed port cable 34 is in tension and the starboard cable 34a is in compression whereby a counterclockwise force moment is applied to the vessel about its center of gravity to thereby prevent the clockwise roll. In FIGURE 8b at the trough of the wave the underwater stabilizing body is below its mean depth but the deck of the vessel is horizontal and no force moment is applied through the cables. In FIGURE 8c the rolling force due to the wave action imparts a counterclockwise force moment about the center of gravity of the ship as the vessel tries to assume a slope at which the decks are parallel to the slope of the wave. The stabilizing body 38 again rises to the mean depth but remains in the same horizontal position. It thus resists the forces trying to move it to the right in the figure and thereby imparts a clockwise force moment to the ship to thereby resist the rolling force. Thus, in this position the starboard cable 34a is in tension while the port cable 34 is in compression. In FIGURE 8d at the peak of the wave the underwater body is at its highest point above its mean depth but is again in the same horizontal position with no moment forces applied.

The compliance of the embodiment shown in FIGURES 1, 2 and 3 in effect adds one more degree of freedom to the system. It is this fundamental difference which allows complete removal of the rolling motion. The same fundamental difference also allows the depth at which the water trap must be located to be greatly diminished. Thus, as a vessel is pulled onto a wave (FIGURE 8a) the deck would tend to deviate from the horizontal as it tilts with the slope of the wave. However, the deviation from the horizontal does not occur with the present invention because of the resistance of the stabilizing body to movement in the horizontal transverse direction. This resistance imparts a force moment through rigid connecting members, as in the embodiment of FIGURES 4, 5 and 6, to the vessel around its longitudinal centerline and opposite to the direction in which the deck is attempting to deviate from the horizontal. When the structural connections between the stabilizing body and the vessel are rigid the force moment imparted to the vessel sometimes overcompensates for the tilting motion caused by the wave; as a result the vessel leans into the wave and the deck deviates from the horizontal in a direction opposite the slope of the wave. If, however, an elastic restoring force is provided for the connecting cables or other members, the cables can be made to vary in length so that a desired degree of rolling motion is achieved. Thus, overcompensation by the stabilizing body is prevented by allowing spring means 30 and 30a to adjust or vary the relative length of cables 34 and 34a (i.e., cable 34 becomes longer and cable 34a becomes shorter or vice versa or only one cable changes in length) at a point in time at which the vessel would otherwise lean into the wave.

The analysis made in connection with rigid connections as in FIGURES 4, 5 and 6 can be continued for elastic connections as in FIGURES 1, 2 and 3 as follows. Assume that in FIGURE 11 and the force F and the displacement d are linearly related by the relation $$F = kd \quad (6)$$

If it is desired that the rolling motion be eliminated entirely (R—0), then the F is given by $$F = KA \cos 2\pi\left(\frac{x}{L} - \frac{t}{T}\right) \quad (7)$$

and a turning moment $M_{st}$ is acting on the ship of magnitude $$M_{st} = KDA \cos 2\pi\left(\frac{x}{L} - \frac{t}{T}\right) \quad (8)$$

It is again assumed that the sway is given by (3) which is a sufficiently good approximation. The moment $M_{st}$ must now cancel the opposite moment associated with the slope of the wave. This moment $M_w$ is given to a good approximation by $$M_w = W M_G \frac{dY}{dx} \quad (9)$$

or $$M_w = W M_G \frac{2\pi}{L} A \cos 2\pi\left(\frac{x}{L} - \frac{t}{T}\right) \quad (10)$$

where W is the weight of the ship and $M_G$ the metacentric height. Putting $M_{st}$ and $M_w$ equal leads to $$KD = W M_G \frac{2\pi}{L} \quad (11)$$

or $$K = 2\pi \frac{W M_G}{DL} \quad (12)$$

For a given wave length L, there is consequently a spring constant K for which there will be no rolling motion. It is an important fact that this is true for *all* wave periods, including a wave period equal to the resonance period of the ship without the stabilizer of the present invention.

The case R=0 is a special case. The general case R≠0 may be analyzed as follows. The equation of motion for the ship in roll is of the type $$I\ddot{\beta} = k_1(B \sin \omega t - \beta) + k_2(-C \sin \omega t - \beta) \quad (13)$$

where

I is the effective moment in inertia of the ship in roll
β the angle of roll

ω angular velocity of wave $B \sin \omega t$ the instantaneous angle of the tangent wave plane with the horizontal $C \sin \omega t$ the instantaneous angle of roll if connecting structure were rigid $k_1$ the effective spring constant for the coupling of the ship to the wave $k_2$ the effective spring constant for the coupling of the ship to the stabilizer Eq. 13 can be rewritten $$I\ddot{\beta} + (k_1+k_2)\beta = (k_1 B - k_2 C) \sin \omega t \quad (14)$$

As $k_2$ and K in (6) are related (in a manner to be shown later), the effect of changing K can conveniently be shown by finding a solution to (14) for a selection of $k_2/k_1$ values. These solutions have the following characteristics:

(a) For every $k_2/k_1$ value, the characteristic resonance behavior is obtained. The resonance frequence is $$\sqrt{k_1+k_2}/I$$

For $k_2=0$ this frequency is $\sqrt{k_1}/I$ which is the roll resonance frequency for the ship without stabilizer.

(b) For very small ω, the solution to (14) is $$\beta = \frac{k_1 B - k_2 C}{k_1+k_2} \sin \omega t = Q \sin \omega t \quad (15)$$

(c) For $k_2/k_1 = B/C$ $\beta = 0$ (d) For $k_2/k_1 > B/C$ the amplitude has a negative sign and becomes $-C$ for a ratio of infinity, (e) For all values of $k_2/k_1$ the phase angle goes from zero for small ω through 90° at resonance and approaches 180° as ω grows larger.

For each $k_2/k_1$ value, a solution to (14) as a function of ω can be defined. Four examples are shown in FIGURES 10a–d.

These solutions can be discussed as follows. Where $\omega < \omega_0$, as the $k_2/k_1$ ratio increases from zero, both the amplitude of response and the phase angle decrease (the latter because the resonance frequency becomes farther removed from ω). The amplitude goes through zero for $$k_2/k_1 = B/C$$

and then becomes negative; (i.e., the ship then leans into the wave).

Figure 9A:
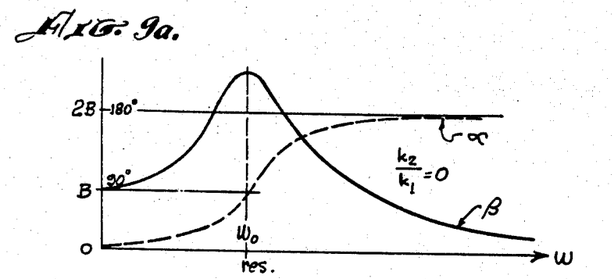
FIGURE 9 shows illustrative graphical solutions of angle of roll at various predetermined spring constants of the elastic connection to the stabilizer body; and, FIGURE 10 is a schematic diagram showing certain physical relationships and factors.
Figure 9B:
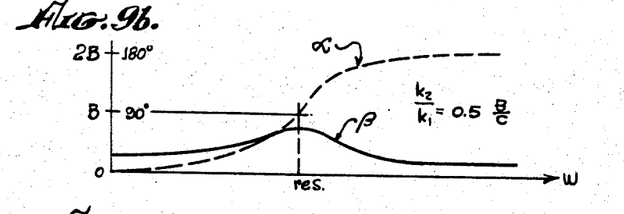
Figure 9C:
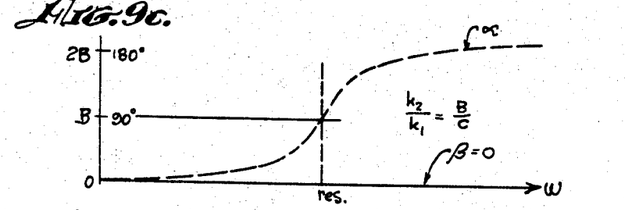
Figures 9D, 10:
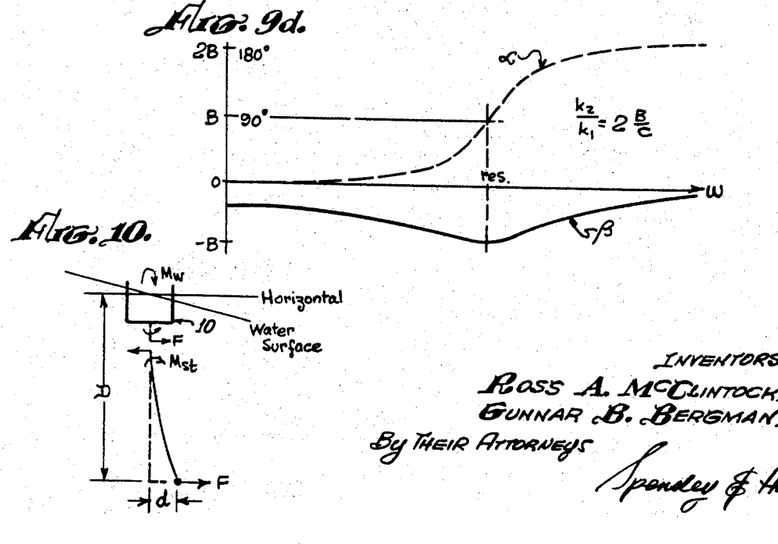

As shown in FIGURE 10c wherein $\omega < \omega_0$ for ships with reasonable roll damping, it *appears* that as the $k_2/k_1$ ratio increases from zero, the amplitude of response decreases. The phase angle α also decreases from a value greater than 90°. These changes in R and α take place in such a way that the ship leans into the wave at first, but with a decreasing angle of roll. It then begins to lean with the wave. Ultimately, however, it will again begin to lean into the wave. For the special case of $$\omega = \sqrt{\frac{k_1}{I}} \sqrt{1+\frac{B}{C}}$$

(and keeping $B/C$ constant), the ship always leans into the wave except for $k_2/k_1 = B/C$ when the angle of lean is zero.

In summary, it can be said that in the instance in which ω is less than $\omega_0$ as shown in FIGURE 10a, the introduction of the stabilizer provides all the roll control needed. In the instance in which ω is greater than $\omega_0$, the degree of control remains substantial. The stabilizer permits complete elimination of the rolling motion, but a close-to-optimal combination of roll and sway is harder to achieve primarily because the phase angle cannot be controlled as well.

The relation between the quantities $k_1$ and $k_2$ and parameters used earlier are as follows:

$$k1 = WM_G \quad (16)$$

$$k2 = KD^2 \quad (17)$$

The body 10 strongly resists transverse motion, but offers little resistance to vertical motion. As an illustration, the two baffle underwater bodies in the embodiment of FIGURES 4, 5 and 6 can be described as follows:

The inert mass $M_{tr}$ resisting the transverse motion in the transverse direction is given by $$M_{tr} = m + \rho A w C_v \quad (18)$$

where $m$ is mass of body structure
$\rho$ the density of the water
$A$ the area of a baffle
$w$ the distance between the baffles
$C_v$ a geometric form factor typically about 2

The inert mass $M_v$ resisting the vertical motion is given by $$M_v = m \quad (19)$$

To describe the motion, a very large mass $M_{tr}$ and total roll removal can be considered. From (8) and (12) is obtained $$M_{st} = 2\pi \frac{WM_G}{DL} DA \cos \omega t \quad (20)$$

The corresponding force F is given by $$F = 2\pi \frac{WM_G}{DL} A \cos \omega t \quad (21)$$

To qualify as a large mass, the excursion of the mass must be considerably smaller than A and the equation of motion is to a good approximation $$M_{tr} \cdot \frac{d^2 x}{dt^2} = F_z = 2\pi g \frac{WM_G}{DL} A \cos \omega t \quad (22)$$

and $$x = \frac{2\pi g}{\omega^2} \frac{WM_G}{M_{tr} DL} A \cos \omega t \quad (23)$$

and $$\frac{2\pi g}{\omega^2} \frac{WM_G}{M_{tr} DL} \ll 1 \quad (24)$$

or $$M_{tr} \gg \frac{2\pi g}{\omega^2} \frac{WM_G}{DL} \quad (25)$$

But $$L = \frac{g}{2\pi} T^2 = \frac{g}{2\pi \nu^2} = 2\pi \frac{g}{\omega^2}$$

Therefore $$M_{tr} \gg \frac{2\pi g}{\omega^2} \frac{WM_G}{D} \frac{\omega^2}{2\pi g}$$

or $$M_{tr} \gg WM_G/D \quad (26)$$

The motion of the baffles will be further reduced due to drag and due to the penetration of the wave motion to the depth where the baffles are located. This wave motion tends to cancel the baffle motion. The amplitude $A_D$ of the wave at depth D is $$A_D = Ae - 2\pi D/L \quad (27)$$

If the constant K is chosen so that a certain desired R value is obtained for a given wave period, then R will decrease as the wave period is increased (keeping K constant). Sooner or later R will become negative and the ship will begin to lean into the wave. This leaning into the wave is enhanced by the approach of a resonance condition in which the mass $M_{tr}$ acts as a pendulum with a restoring force consisting of the gravitational force on the baffle system augmented by the spring force in the connecting structure and the equivalent spring force of the ship stiffness, the latter two in series. For even longer wave periods, this resonance is passed and the ship again leans with the wave.

As discussed hereinbefore in various instances it can be seen that the complete elimination of roll of a buoyant body would not necessarily be the optimal roll characteristics. For example, in a drilling vessel the minimization or elimination of forces acting on men and equipment parallel to the working deck due to roll of the drilling vessel would be the most desirable operating conditions. Thus, for example, if a heavy piece of drilling equipment is suspended from the crown block to the working deck its position relative to the working deck and a man thereon should optimally be stationary. As discussed hereinbefore, in accordance with the present invention this is achieved if the combined sway and roll of the vessel are such that the resultant forces of gravity and inertia acting upon crew members and objects they are handling are perpendicular to the deck upon which they are working. Such optimum roll can be found as follows and can be achieved by means of the present invention:

Assume a wave form:

$$Y = A \sin 2\pi\left(\frac{x}{L} - \frac{t}{T}\right) \qquad (28)$$

$$X = A \cos 2\pi\left(\frac{x}{L} - \frac{t}{T}\right) \qquad (29)$$

where X and Y are horizontal and vertical surface water particle coordinates. We then have Sway acceleration $$\ddot{X} = \frac{4\pi^2}{T^2} A \cos 2\pi\left(\frac{x}{L} - \frac{t}{T}\right) \qquad (30)$$

The slope of the wave $$\frac{dY}{dx} = \frac{2\pi}{L} A \cos 2\pi\left(\frac{x}{L} - \frac{t}{T}\right) \qquad (31)$$

Horizontal displacement $D_x$ of point of height $h$ relative to reference point on ship at mean water line for roll factor R and assuming phase angle $\alpha$ to be zero $$D_x = \frac{dY}{dv} Rh = -\frac{2\pi}{L} ARh \cos 2\pi\left(\frac{x}{L} - \frac{t}{T}\right) \qquad (32)$$

Acceleration $$\ddot{D}_x$$

associated with this displacement $$\ddot{D}_x = \frac{2\pi}{L} ARh \frac{4\pi^2}{T^2} \cos 2\pi\left(\frac{x}{L} - \frac{t}{T}\right) \qquad (33)$$

$$\ddot{X} - \ddot{D}_x = \frac{4\pi^2}{T^2} A\left(1 - \frac{2\pi}{L} Rh\right) \cos 2\pi\left(\frac{x}{L} - \frac{t}{T}\right) \qquad (34)$$

Slope S of total inertial and gravitational force relative to vertical when cosine factor is unity $$S = \frac{4\pi^2 A\left(1 - \frac{2\pi}{L} Rh\right)}{T^2 g} \qquad (35)$$

This slope must now be the same as the slope of the deck $$R\frac{dy}{dx}$$

relative to the horizontal at the same time. Therefore $$R\frac{2\pi}{L} A = \frac{4\pi^2 A\left(1 - \frac{2\pi}{L} Rh\right)}{T^2 g} \qquad (36)$$

But $$L = \frac{g}{2\pi} T^2 \qquad (37)$$

By substitution $$R = 1 - \frac{2\pi}{L} Rh \qquad (38)$$

or $$R = \frac{1}{1 + 2\pi\frac{h}{L}} \qquad (39)$$

Ex. 1: For $h=0$ (mean water level) $R=1$
Ex. 2: For $h=L/2\pi$ $R=\frac{1}{2}$

As R changes with $h$, the optimum conditions strictly speaking apply only to the handling of objects of vertical dimensions much smaller than the wave length L. This is not necessarily the case. For example, sections of drill pipe may be hanging in a cable suspension from the top of a derrick. In this case, the average R for upper and lower end of pipe may be optimal.

One advantage of the present invention is that a vessel can be stabilized against roll by coupling it to a stabilizing body which depends vertically beneath the hull and imparts a force moment to the structure oppositely to that imparted by wave action. The method of coupling such a stabilizing body to the hull of a vessel is unique in that floatation bodies and a cradle are utilized in such a manner that the stabilizing body depends from the floatation bodies; the floatation bodies, the cradle and the stabilizing body thereby form an independent integral structure separate and distinct from the hull of the vessel. When it is desired to stabilize a vessel the floatation bodies with the stabilizing body depending therefrom can be made less buoyant by pumping ballast into them, thus lowering the cradle to a distance below the surface of the water such that a vessel can be maneuvered into position above them. The ballast is then discharged from the floatation bodies which rise and force the cradle contour to mate with the hull with sufficient force to couple the stabilizing body to the hull. It will at once be apparent that the above arrangement can be used in either deep or shallow water (so long as the water is deep enough to cover the floatation bodies and the stabilizing body) and allows the vessel to proceed from one location to another location without any attached stabilizing mechanism. Yet another advantage of the present invention is that the stabilizing body and coupling means can easily be towed to a new drilling operation with very little hazard to itself or to the towing vessel or can be anchored and retained in location for future use at the well site. Thus, the vessel can be moved and return to the well site for servicing or other operation upon the well while the stabilization structure can be retained as a permanent or semi-permanent installation at the well site.

What is claimed is:
1. A floating structure stabilized against rolling and movements induced by wave action comprising:
   a buoyant body;
   a stabilizing body coupled to and positioned a substantial distance beneath said buoyant body below the severe wave and surface action of the water, said stabilizing body being freely movable in a vertical direction and being adapted to resist movement in a direction transverse to said direction; and,
   coupling means connecting said stabilizing body to said buoyant body to transmit a force moment to said buoyant body, said means being selectively separable from said buoyant body by reducing the buoyancy of said coupling means thereby causing said coupling means to sink lower into the water.
2. A floating structure stabilized against rolling movements induced by wave action comprising:
   a buoyant body;
   a stabilizing body positioned a substantial distance beneath said buoyant body below the severe wave and surface action of the water;
   said underwater under stabilizing body being so constructed and arranged as to be freely movable in the vertical direction and to resist movement in the horizontal direction transverse to said one direction; and,
   coupling means connecting said stabilizing body to said buoyant body to transmit a force moment to said buoyant body, said coupling means being selectively separable from said buoyant body by reducing the buoyancy of said coupling means thereby causing it to sink lower in the water.

3. A floating structure stabilized against rolling and pitching movements induced by wave action comprising:
 a buoyant body;
 a stabilizing body positioned beneath said buoyant body at a predetermined depth below wave action, said stabilizer body being vertically movable and adapted to entrap a mass of water to provide inertial resistance to acceleration in at least one horizontal direction; and,
 coupling means connecting said stabilizing body to said buoyant body to transmit a force moment to said buoyant body, said means being selectively separable from said buoyant body by reducing the buoyancy of said coupling means thereby causing it to sink lower in the water.

4. A stabilizing structure for a buoyant body to stabilize against rolling movements comprising:
 a stabilizing body being freely movable in one direction and being adapted to resist movement in a direction transverse to said direction, said stabilizing body being submerged in water and in direct contact therewith; and,
 coupling means for positioning said stabilizing body below the severe wave and surface action of the water and adapted to transmit a force moment to a buoyant body, said means being selectively joinable to a buoyant body by selectively increasing or decreasing the buoyancy of said coupling means which forces it against or removes it from said buoyant body.

5. The apparatus as defined in claim 1 in which said stabilizing body comprises a vertically oriented open ended cylinder.

6. The apparatus as defined in claim 1 in which said stabilizing body comprises at least two spaced parallel plates, said plates being parallel to the longitudinal centerline of the vessel.

7. A floating drilling vessel stabilized against rolling motion induced by wave action comprising:
 a floating drilling vessel;
 first and second stabilizing bodies longitudinally spaced and vertically positioned beneath the longitudinal centerline of said vessel, said stabilizer bodies being spaced beneath said vessel at a depth below severe surface and wave action of the water; and,
 coupling means for coupling said first and second stabilizing bodies to said drilling vessel to transmit a force moment to said vessel, said means being selectively separable from said vessel by reducing the buoyancy of said coupling means thereby causing it to sink lower into the water.

8. A floating drilling vessel stabilized against rolling movements induced by wave action comprising:
 a buoyant drilling vessel;
 a first and second pair of underwater water entrapping stabilizing bodies, each said pair of stabilizing bodies being longitudinally spaced along the hull of said vessel, each one of said stabilizing bodies depending vertically below the hull of said vessel and on opposite sides of said hull offset from a vertical plane passing through the longitudinal centerline of said vessel; and,
 coupling means for coupling said stabilizing bodies to the hull of said vessel, said coupling means being connected to said stabilizing bodies by vertically depending structural members, said coupling means being selectively separable from said hull by reducing the buoyancy of said coupling means thereby causing it to sink lower into the water.

9. A floating structure stabilized against rolling movements induced by wave action comprising:
 a buoyant body;
 a stabilizing body positioned beneath said buoyant body at a predetermined depth below wave action;
 coupling means for coupling said stabilizing body with said buoyant body, said coupling means having at least two floatation bodies and a cradle, said cradle comprising a generally arcuate member and being attached proximate both ends thereof to said floatation bodies, said cradle having the concave side of said arcuate member facing upwardly and adapted to fit the contour of said hull, said coupling means being constructed so that a force moment is transmitted from said stabilizing body by said coupling means to said buoyant body about said longitudinal centerline thereof oppositely to that imparted by wave action.

10. The structure of claim 9 wherein said floatation bodies comprise a watertight generally cylindrical hollow body capable of having ballast placed therein and discharged therefrom, said floatation body when emptied of ballast being adapted to exert an upwardly force due to buoyancy against said cradle.

11. The apparatus of claim 9 in which said stabilizing body and said coupling means are connected by struts affixed to said floatation bodies at opposite sides of the longitudinal centerline of the vessel.

References Cited
UNITED STATES PATENTS

| 83,420 | 10/1868 | Stoner et al. | 114—124 |
| 131,719 | 9/1872 | Stoner | 114—124 |
| 1,100,771 | 6/1914 | Palesch | 114—122 |
| 3,018,749 | 1/1962 | De Beurs | 114—126 |
| 3,279,404 | 10/1966 | Richardson | 114—.5 |

FOREIGN PATENTS

| 305,134 | 1/1933 | Italy. |

MILTON BUCHLER, *Primary Examiner.*

T. M. BLIX, *Assistant Examiner.*